(12) United States Patent
Noda et al.

(10) Patent No.: US 10,431,094 B2
(45) Date of Patent: Oct. 1, 2019

(54) OBJECT DETECTION METHOD AND OBJECT DETECTION APPARATUS

(71) Applicant: Nissan Motor Co., Ltd., Yokohama-shi, Kanagawa (JP)

(72) Inventors: Kuniaki Noda, Kanagawa (JP); Fang Fang, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/305,000

(22) PCT Filed: May 30, 2016

(86) PCT No.: PCT/JP2016/065903
§ 371 (c)(1),
(2) Date: Nov. 27, 2018

(87) PCT Pub. No.: WO2017/208296
PCT Pub. Date: Dec. 7, 2017

(65) Prior Publication Data
US 2019/0213886 A1    Jul. 11, 2019

(51) Int. Cl.
G08G 1/16    (2006.01)
G08G 1/01    (2006.01)
G01S 17/06    (2006.01)
G01C 21/26    (2006.01)
G08G 1/04    (2006.01)
H04N 13/204    (2018.01)

(52) U.S. Cl.
CPC ............. *G08G 1/166* (2013.01); *G01C 21/26* (2013.01); *G01S 17/06* (2013.01); *G08G 1/0112* (2013.01); *G08G 1/0125* (2013.01); *G08G 1/04* (2013.01); *H04N 13/204* (2018.05)

(58) Field of Classification Search
CPC .... G08G 1/166; G08G 1/0112; G08G 1/0125; G01C 21/26; G01S 17/06; H04N 13/204
USPC ......................................................... 701/301
See application file for complete search history.

(56) References Cited

U.S. PATENT DOCUMENTS 9,395,192 B1 * 7/2016 Silver ................ G06K 9/00798
9,940,527 B2 * 4/2018 Lee ..................... G06K 9/00798
2008/0243389 A1    10/2008 Inoue et al.
2014/0358420 A1 * 12/2014 Noh ........................ G01C 21/28
701/409

(Continued)

FOREIGN PATENT DOCUMENTS

EP    3410419 A1    12/2018
JP    H10141954 A    5/1998

(Continued)

*Primary Examiner* — Marthe Y Marc-Coleman
(74) *Attorney, Agent, or Firm* — Young Basile Hanlon & MacFarlene, P.C.

(57) ABSTRACT

An object detection method includes: acquiring three-dimensional data on an area around a host vehicle by use of a distance measurement sensor; based on map data on an area around a current position of the host vehicle, setting a planned travel area where the host vehicle is going to travel in the future; estimating crossing object existence areas where there currently exist objects which are likely to cross the host vehicle in the future in the set planned travel area; and detecting the object by use of the three dimensional data on insides of the estimated crossing object existence areas.

10 Claims, 16 Drawing Sheets

(56) References Cited

U.S. PATENT DOCUMENTS

2015/0153184 A1  6/2015  Mudalige et al.
2016/0140847 A1  5/2016  Kawamata et al.

FOREIGN PATENT DOCUMENTS

| JP | 2008242544 A | 10/2008 |
| JP | 2009271766 A | 11/2009 |
| JP | 2010211301 A | 9/2010 |
| JP | 201695697 A | 5/2016 |

* cited by examiner

OBJECT DETECTION METHOD AND OBJECT DETECTION APPARATUS

TECHNICAL FIELD

The present invention relates to an object detection method and an object detection apparatus which acquire three-dimensional data on an area around a host vehicle by use of a distance measurement sensor and detect an object by use of the acquired three-dimensional data.

BACKGROUND

Japanese Patent Application Publication No. H 10-141954 discloses an obstacle detection apparatus for detecting an obstacle on a planned travel route of a moving body. The obstacle detection apparatus disclosed in Japanese Patent Application Publication No. H 10-141954 extracts a part corresponding to a travelling road surface from a three-dimensional image based on three-dimensional coordinate positional data on a travelling road and a current three-dimensional position of the moving body and detects an obstacle from the extracted part corresponding to the travelling road surface.

The above-mentioned conventional obstacle detection apparatus, however, suffers from a problem of: detecting only an obstacle existing on the surface of a planned travel route of the host vehicle; being thus incapable of detecting an object currently not existing on the surface of the planned travel route of the host vehicle; and being accordingly incapable of beforehand detecting an object which is likely to cross the host vehicle in the future.

SUMMARY

The present invention has been proposed with the above situation taken into consideration. A purpose of the present invention is to provide an object detection method and an object detection apparatus capable of beforehand detecting an object which is likely to cross a host vehicle in the future.

For the purpose of solving the above problem, an object detection method and an object detection apparatus according to an aspect of the present invention acquire three-dimensional data on an area around a host vehicle by use of a distance measurement sensor. Based on map data on an area around a current position of the host vehicle, the object detection method and the object detection apparatus estimate crossing object existence areas where there currently exist objects which are likely to cross the host vehicle in the future in a planned travel area where the host vehicle is going to travel in the future, The object detection method and the object detection apparatus detect the object by use of the three-dimensional data on insides of the crossing object existence areas.

The present invention makes it possible to beforehand detect an object which is likely to cross the host vehicle in the future.

DETAILED DESCRIPTION

First Embodiment

Figure 1:
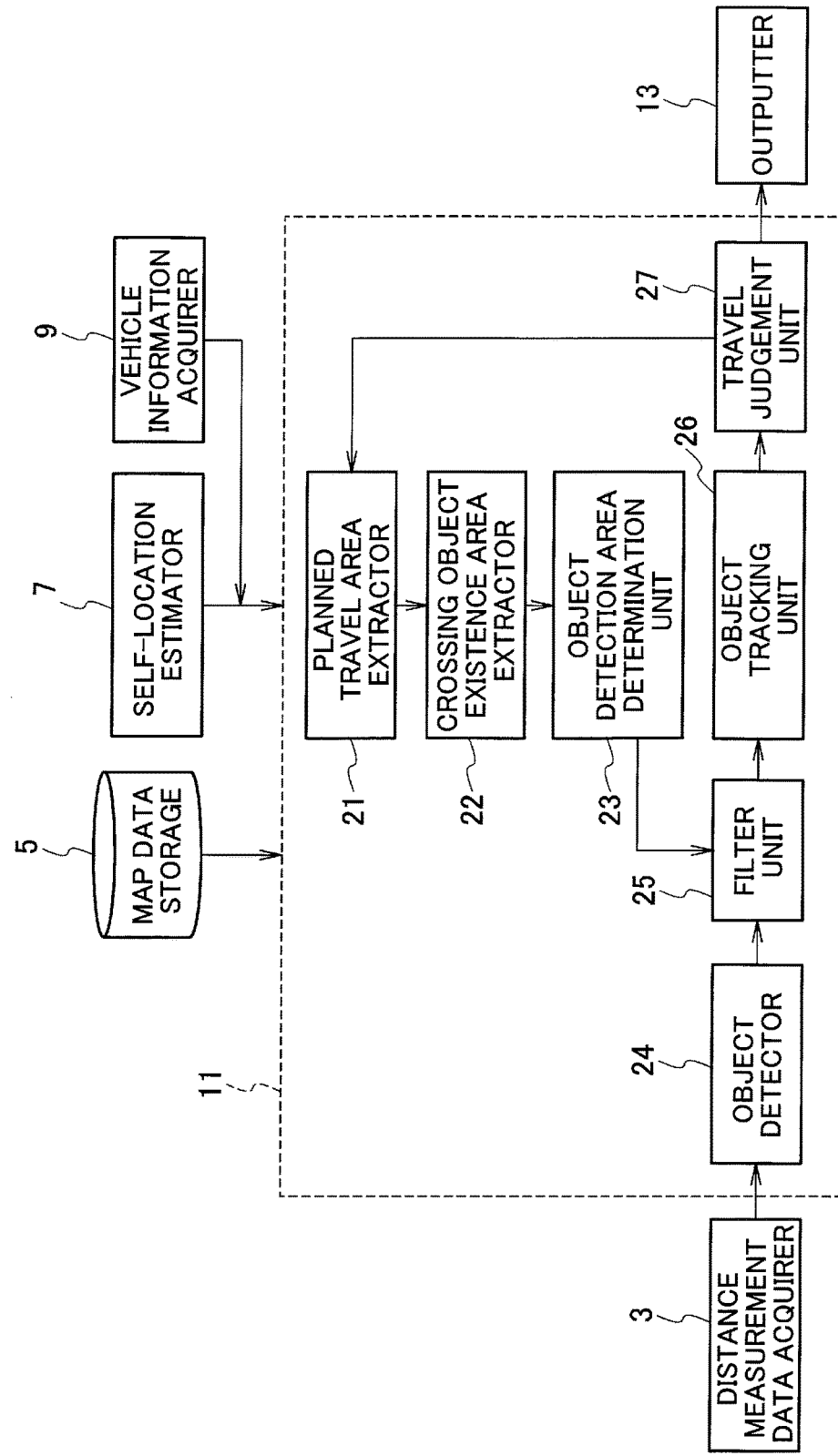
FIG. 1 is a block diagram illustrating a configuration of an object detection apparatus according to a first embodiment of the present invention.

Referring to the drawings, descriptions will be provided for a first embodiment to which the present invention is applied.

[Configuration of Object Detection Apparatus]

FIG. 1 is a block diagram illustrating a configuration of an object detection apparatus according to the first embodiment. As illustrated in FIG. 1, the object detection apparatus 1 according to the first embodiment includes a distance measurement data acquirer 3, a map data storage 5, a self-location estimator 7, a vehicle information acquirer 9, a central controller 11 and an outputter 13. Based on distance measurement data acquired by the distance measurement data acquirer 3, the object detection apparatus 1 detects objects using the central controller 11 which functions as an object detector, and outputs a detection result from the outputter 13. In this process, the central controller 11 estimates an area where there exist objects which are likely to cross a host vehicle by use of vehicle information acquired by the vehicle information acquirer 9, self-location information estimated by the self-location estimator 7, map data stored in the map data storage 5, and the like, as well as thereby detects objects.

The distance measurement data acquirer 3 is a distance measurement sensor, installed in the host vehicle, for detecting distances between the host vehicle and distance measurement points around the host vehicle. The distance measurement data acquirer 3 acquires three-dimensional distance measurement data (also referred to as "distance data") on an environment around the host vehicle (including not only three-dimensional objects but also road surfaces). This three-dimensional distance measurement data includes information on things such as a three dimensional position, and a distance of each distance measurement point. A laser radar inclusive of multiple laser beam scanning lines and capable of detecting high-resolution distance data is used as the distance measurement sensor. With regard to the method of acquiring the distance data, no specific restriction has to be imposed on the measurement device, the measurement capability, or the data output format. For example, a stereo camera may be used as the measurement device. Otherwise, an active stereo method in which stereo photography is performed by projecting an already-known pattern on an object may be used.

The map data storage 5 is a database which stores high-precision map data. The map data storage 5 may be installed in the host vehicle, or may be set in a server or the like. The map data includes not only general map information on roads, intersections, bridges, tunnels and the like, but also road structure information on the position and lane category of each vehicle traffic lane, the presence or absence of a median strip, the position and shape of each pedestrian crossing, bicycle lanes, and the like. The map data further includes road regulation information on turn prohibition, overtaking prohibition, one-way traffic flows, and the like.

The self-location estimator 7 generates self-location information by estimating the self-location of the host vehicle by use of a global positioning system (GPS). The generated self-location information includes not only positional information on things such as the latitude and longitude of the host vehicle, but also information on things such as the vehicle traffic lane, traveling direction, and attitude in which the host vehicle is traveling.

The vehicle information acquirer 9 acquires vehicle information on traveling conditions of the host vehicle, which includes a speed of the host vehicle acquired from a vehicle speed sensor, an acceleration of the host vehicle acquired from an acceleration sensor, an angular velocity of the host vehicle acquired from a gyro sensor. The vehicle information acquirer 9 may be configured to acquire the vehicle information directly from each sensor, or from an in-vehicle network such as a controller area network (CAN), for example.

The outputter 13 is a display unit for presenting an object detection result to an occupant of the vehicle. The outputter 13 may be a display screen of an on-board navigation system, or a display for displaying an image captured by an on-board camera. Otherwise, the outputter 13 may be a head-up display.

The central controller 11 is a controller which performs an object detection process of detecting objects existing around the host vehicle by use of the three-dimensional distance measurement data acquired by the distance measurement data acquirer 3. The central controller 11 includes a planned travel area extractor 21, a crossing object existence area extractor 22, an object detection area determination unit 23, an object detector 24, a filter unit 25, an object tracking unit 26 and a travel judgement unit 27 which are functional units for performing the object detection process.

Next, descriptions will be provided for components included in the central controller 11. To begin with, the planned travel area extractor 21 acquires the map data from the map data storage 5, the self-location information from the self-location estimator 7, the vehicle information from the vehicle information acquirer 9, and the travel plan information from the travel judgement unit 27. Thereby, the planned travel area extractor 21 extracts a planned travel area where the host vehicle is going to travel in the future. In this point, the planned travel area extractor 21 sets the planned travel area based on travel plan information. The planned travel area is set on a planned travel route from the current position of the host vehicle to the destination, particularly on a vehicle traffic lane on a road which the host vehicle is estimated to travel. Accordingly, in a case where the host vehicle is going to make a left turn at an intersection, the planned travel area is set on the left-turn lane. In a case where the host vehicle is going to travel straight, the planned travel area is set on a straight-traveling lane. In addition, in a case where there are multiple vehicle traffic lanes on the road, the planned travel area is set on one of the lanes. Incidentally, the travel plan information does not have to be information on the planned travel route from the current position of the host vehicle to the destination. The travel plan information may be, for example, information on the planned travel route from the current position of the host vehicle to a point on the way to the destination, such as a planned travel route from the current position of the host vehicle to the next intersection, or a planned travel route from the current position of the host vehicle to a point where the host vehicle is going to complete a lane change.

The crossing object existence area extractor 22 acquires the planned travel area extracted by the planned travel area extractor 21, and the map data from the map data storage 5. Using them, the crossing object existence area extractor 22 estimates and extracts crossing object existence areas where there exist objects which are likely to cross the host vehicle in the future in the planned travel area. Particularly, from the road structure information included in the map data, the crossing object existence area extractor 22 estimates directions in which the respective objects existing around the host vehicle are traveling, and estimates the crossing object existence areas based on the estimated traveling directions of the objects.

The object detection area determination unit 23 acquires the planned travel area extracted by the planned travel area extractor 21, and the crossing object existence areas extracted by the crossing object existence area extractor 22.

Using them, the object detection area determination unit 23 determines an object detection area where to detect objects around the host vehicle. In the first embodiment, the object detection area is determined by combining the planned travel area and the crossing object existence areas. Instead, only the crossing object existence areas may be determined as the object detection area.

The object detector 24 acquires the distance measurement data detected by the distance measurement data acquirer 3, and detects the objects existing around the host vehicle. Particularly, the object detector 24 detects three-dimensional objects by dividing a group of the distance measurement points in the distance measurement data into distance measurement points belonging to the ground surfaces and distance measurement points belonging to the three-dimensional objects. Incidentally, the object detection method is not limited to that based on the three-dimensional distance data acquired by the distance measurement sensor. The object detection method may be that based on three-dimensional data acquired by other sensors such as a camera, a millimeter-wave radar and an ultrasonic sensor.

The filter unit 25 acquires the positions and attitudes of the objects detected by the object detector 24, as well as the object detection area determined by the object detection area determination unit 23. From the objects detected by the object detector 24, the filter unit 25 extracts only objects existing inside the object detection area.

The object tracking unit 26 acquires the objects extracted by the filter unit 25, and estimates the states of the objects while performing short-term movement prediction on the objects based on the movement histories of the objects, such as the positions, speeds and accelerations of the objects. Thereafter, the object tracking unit 26 performs object tracking by determining whether the objects observed at one point of time are identical to those observed at another point of time. Incidentally, the Extended Karman Filter (EKF), a particle filter or the like may be used for the object tracking method.

With taken into consideration the tracks and current positions of the respective objects acquired in the process by the object tracking unit 26, the travel judgement unit 27 generates a travel plan of the host vehicle, and outputs the travel plan information. The travel plan information is a planned travel route from the current position of the host vehicle to the destination which is generated with taken into consideration the objects detected by use of the three-dimensional data. The travel plan information is not a mere estimation of a road which the host vehicle is going to travel and an intersection which the host vehicle is going to pass. A vehicle traffic lane which the host vehicle is going to travel is also set in the travel plan information. Since the detected objects are taken into consideration at any time, a route including lane changes is also set in a case where there is a vehicle which is traveling at slow speed before the host vehicle in the same lane, and in a case where there is a vehicle which stops before the host vehicle in the same lane.

It should be noted that the central controller 11 includes: general-purpose electronic circuits such as a microcomputer, a microprocessor or a central processing unit (CPU); and peripherals such as a memory. By executing specific programs, the central controller 11 operates as the planned travel area extractor 21, the crossing object existence area extractor 22, the object detection area determination unit 23, the object detector 24, the filter unit 25, the object tracking unit 26 and the travel judgement unit 27. These functions of the central controller 11 can be implemented by one or more processing circuits. The processing circuits includes, for example, a programmed processing device such as a processing device including an electric circuit, an application specific integrated circuit (ASIC) arranged for the central controller 11 to perform the functions described in the embodiment, and a device such as a conventional circuit part.

[Procedure for Object Detection Process]

Figure 2:
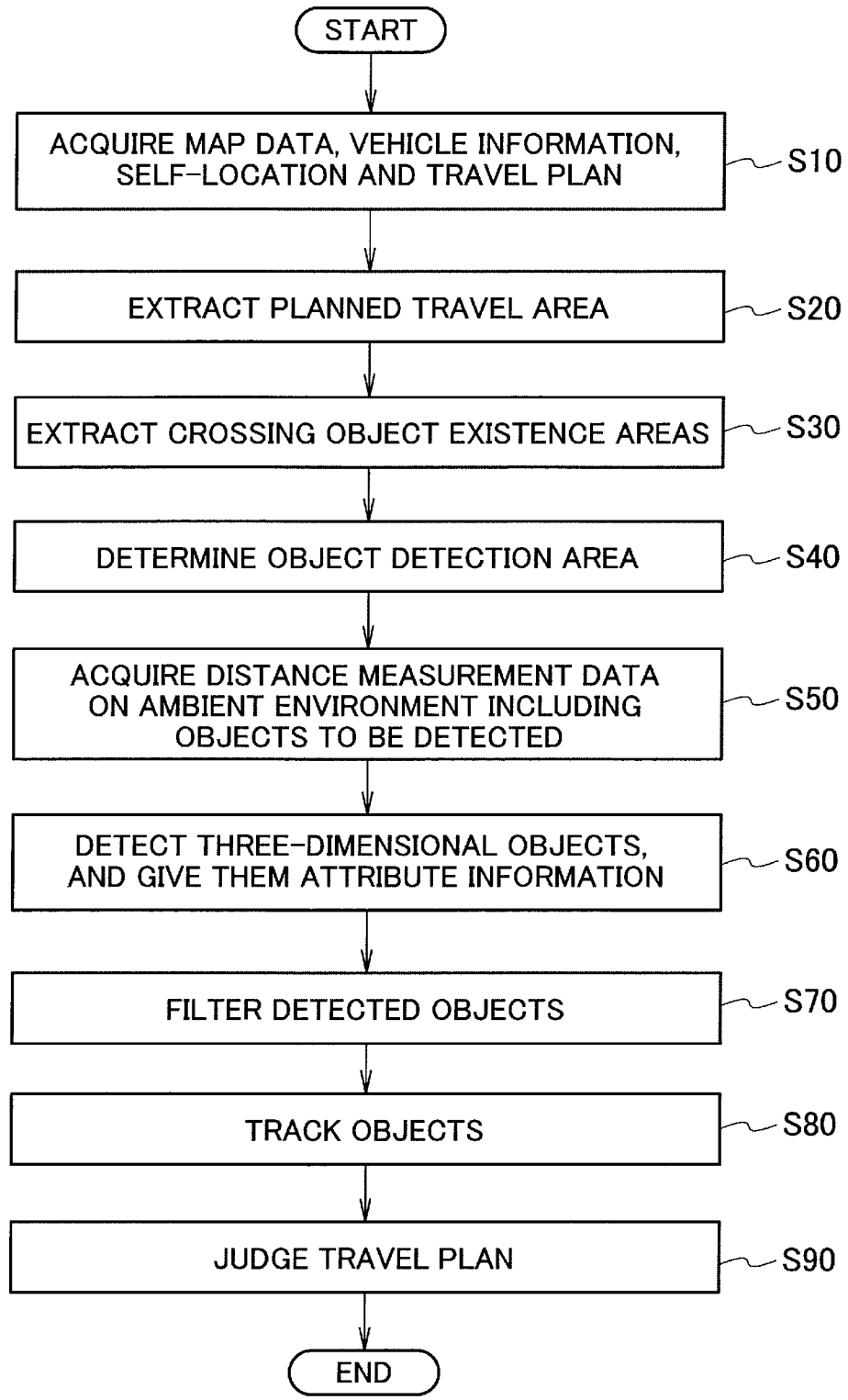
FIG. 2 is a flowchart illustrating a procedure for an object detection process to be performed by the object detection apparatus according to the first embodiment of the present invention.

Next, referring to a flowchart in FIG. 2, descriptions will be provided for the object detection process to be performed by the object detection apparatus 1 according to the present invention.

As illustrated in FIG. 2, first of all, in step S10, the planned travel area extractor 21 acquires the map data from the map data storage 5, the self-location information from the self-location estimator 7, the vehicle information from the vehicle information acquirer 9, and the travel plan information from the travel judgement unit 27.

Figure 3:
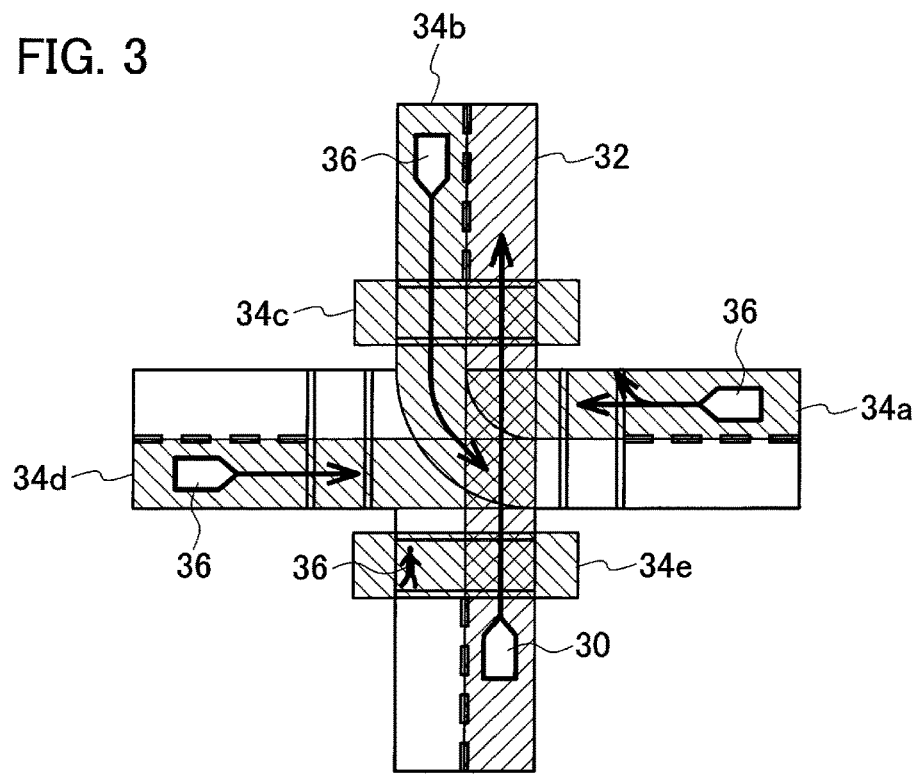
FIG. 3 is a diagram for explaining how to estimate crossing object existence areas in an object detection method according to the first embodiment of the present invention.

In step S20, based on the information acquired in step S10, the planned travel area extractor 21 extracts the planned travel area where the host vehicle is going to travel in the future on the map. As illustrated in FIG. 3, to begin with, based on the self-location information of the host vehicle, the vehicle information, and the map data on the area around the host vehicle, the planned travel area extractor 21 identifies the position of the host vehicle 30. Thereafter, based on the travel plan information acquired from the travel judgement unit 27, the planned travel area extractor 21 recognizes the travel plan in which the host vehicle is going to travel straight through an intersection, as well as sets and extracts a planned travel area 32 in which the host vehicle is going to travel straight through the intersection.

In step S30, the crossing object existence area extractor 22 acquires the planned travel area extracted in step S20, as well as estimates and extracts crossing object existence areas where there currently exist objects which are likely to cross the host vehicle in the future in the planned travel area. In this point, from the road structure information included in the map data, the crossing object existence area extractor 22 estimates the directions in which the respective objects existing around the host vehicle are traveling, and estimates the crossing object existence areas based on the estimated traveling directions of the objects. To put it specifically, from the road structure information, the crossing object existence area extractor 22 acquires information on things such as the positions and shapes of the roads and pedestrian crossings around the current position of the host vehicle, the traveling directions of the vehicle traffic lanes around the current position of the host vehicle. Thereby, the crossing object existence area extractor 22 detects the categories of the roads around the current position of the host vehicle. The detected road categories include not only the vehicle traffic lanes on the roadways, but also pedestrian crossings, bicycle lanes and the like. Thereafter, as illustrated in FIG. 3, from the detected road categories, the crossing object existence area extractor 22 extracts the categories of the roads which cross the planned travel area 32, and thereby extracts crossing object existence areas 34. In this point, the crossing object existence area extractor 22 acquires the traveling directions of the vehicle traffic lanes from the road structure information, and estimates vehicle traffic lanes whose traveling directions point to the planned travel area 32 as the crossing object existence areas 34. For example, in areas 34a, 34d in FIG. 3, the traveling directions of the vehicle traffic lanes which are likely to cross the host vehicle in the future are acquired as straight traveling directions, and if objects 36 currently in the areas 34a, 34d continue traveling straight, the objects 36 will cross the planned travel area 32.

For this reason, the objects 36 are estimated as objects which are likely to cross the host vehicle in the future, while the areas 34a, 34b where the objects 36 currently exist are estimated as crossing object existence areas. Similarly, in an area 34b, the traveling direction of the vehicle traffic lane which is likely to cross the host vehicle in the future is acquired as a left-turn direction. If an object 36 currently in the area 34b turns left, the object 36 will cross the planned travel area 32. For this reason, the area 34b is estimated as a crossing object existence area. In addition, the road categories of areas 34c, 34e are both pedestrian crossings, and the traveling directions of the pedestrian crossings are estimated as crossing the traveling direction of the host vehicle. If pedestrians currently entering the ends of the areas 34c, 34e start to walk along the pedestrian crossings, the pedestrians will cross the planned travel area 32. For this reason, the pedestrians are estimated as objects 36 which will cross the planned travel area 32, while the areas 34c, 34e are estimated as crossing object existence areas. Incidentally, each crossing object existence area is estimates by including its vicinity such as a pedestrian crossing and a pedestrian walkway along the road with taken into consideration an area which a pedestrian and/or a bicycle enters.

Figure 4:
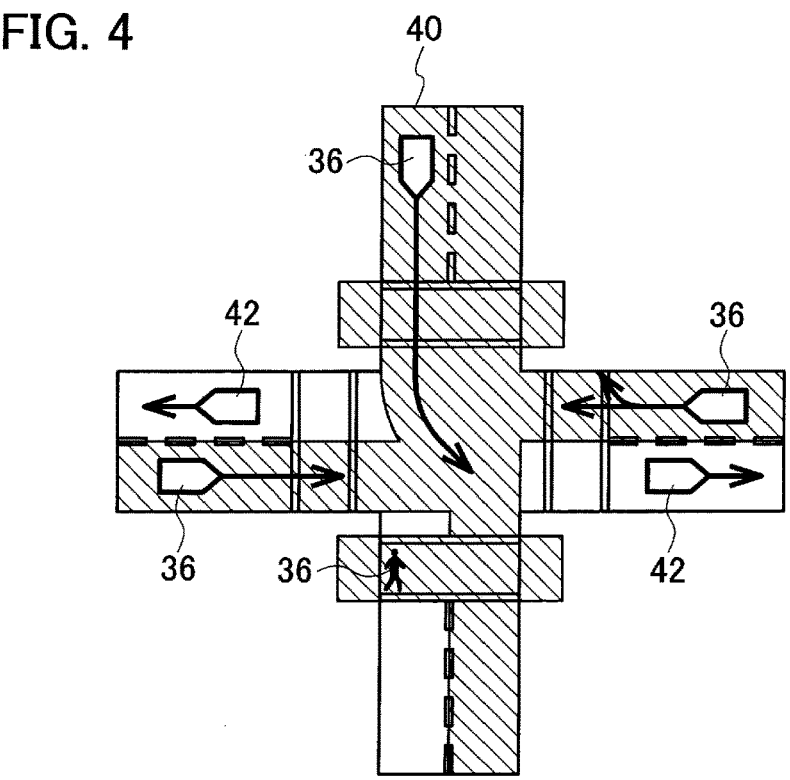
FIG. 4 is a diagram for explaining how to determine an object detection area in the object detection method according to the first embodiment of the present invention.

In step S40, the object detection area determination unit 23 determines an object detection area based on the planned travel area and the crossing object existence areas. As illustrated in FIG. 4, the object detection area determination unit 23 determines an object detection area 40 by combining the planned travel area 32 and the crossing object existence areas 34 in FIG. 3. Incidentally, only the crossing object existence areas may be determined as the object detection area.

In step S50, the distance measurement data acquirer 3 installed in the host vehicle acquires three-dimensional distance measurement data (also referred to as "distance data") on the ambient environment including objects to be detected (including not only the three-dimensional objects but also the road surfaces).

In step S60, the object detector 24 detects multiple three-dimensional objects on the road surfaces by dividing the group of the three-dimensional distance measurement points acquired in step S50 into groups of points belonging to the road surfaces and groups of points belonging to the multiple three-dimensional objects. Furthermore, the object detector 24 estimates the position and attitude of each three-dimensional object from a shape of a group of points belonging to the three-dimensional object. Moreover, the object detector 24 estimates what the object is from the shape and movement history of each three-dimensional object, and gives the detected object an object classification (a vehicle, a pedestrian, a bicycle, and the like). Incidentally, each object classification may be determined according to road category on the map of the corresponding crossing object existence area. For example, in a case where a crossing object existence area is a pedestrian crossing on the map, the object detected therein is given an object classification as a pedestrian or a bicycle. The attribute of the pedestrian and the attribute of the bicycle may be distinguished from each other according to the shape or the like of the object. Otherwise, in a case where the crossing object existence area is a bicycle lane on the map, the object detected therein is given an object classification as the bicycle.

In step S70, the filter unit 25 performs a filtering process of selecting only the objects existing inside the object detection area determined in step S40 from the objects detected in step S60. Thereby, the filter unit 25 extracts the objects to be processed in the following step. For example, from the objects illustrated in FIG. 4, the objects 36 existing inside the object detection area 40 are extracted through the filtering process, but objects 42 existing outside the object detection area 40 are not extracted, that is to say, excluded. Since the objects to be processed in the following step are selected through this filtering process, it is possible to decrease process load. Incidentally, a filtering process of selecting only the groups of three-dimensional distance measurement points existing inside the object detection area determined in step S40 from the groups of three-dimensional distance measurement points acquired in step S50 may be performed in step S60.

In step S80, the object tracking unit 26 estimates the states of the objects extracted in step S70 while performing the short-term movement prediction on the objects based on the movement histories of the objects, such as the positions, speeds and accelerations of the objects. Thereby, the object tracking unit 26 performs the object tracking by determining whether the objects observed at one point of time are identical to those observed at another point of time.

In step S90, based on the tracks and current positions of the respective objects acquired in the tracking process in step S80, the travel judgement unit 27 determines the travel plan of the host vehicle. In other words, the travel judgement unit 27 generates the travel plan by calculating a planned travel route from the current position of the host vehicle to the destination with the detected objects around the host vehicle taken into consideration. In this point, not only the road which the host vehicle is going to travel and an intersection which the host vehicle is going to pass are set in the planned travel route, but also a vehicle traffic lane which the host vehicle is going to travel is set in the planned travel route. Once the generation of the travel plan by calculating the planned travel route is completed, the travel judgement unit 27 outputs travel plan information. The travel judgement unit 27 outputs the travel plan information to the planned travel area extractor 21 and the outputter 13. With this output, the object detection process according to the first embodiment of the present invention is completed.

[Effects of First Embodiment]

Figure 5:
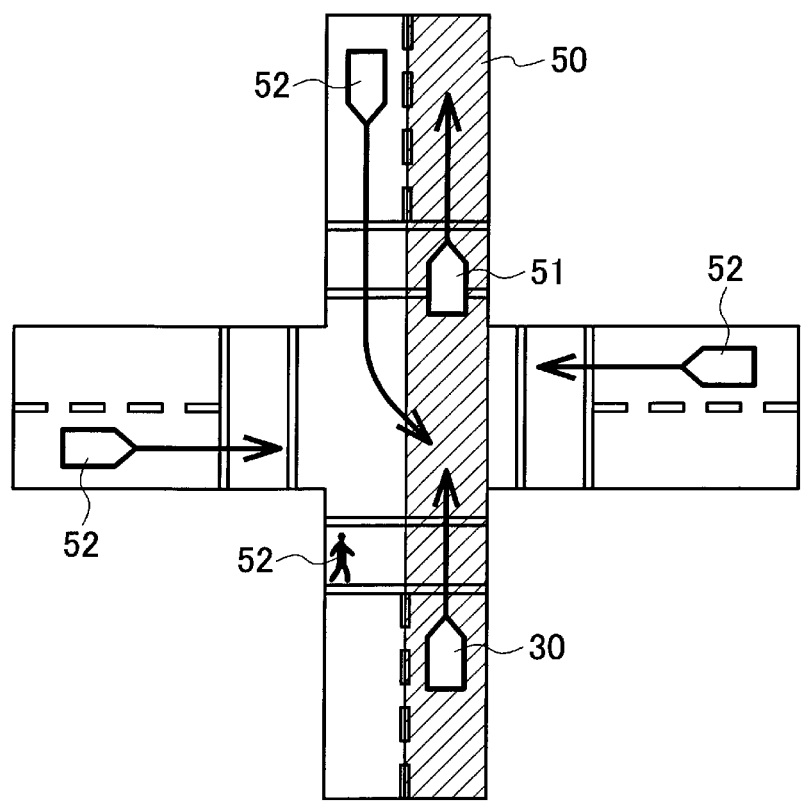
FIG. 5 is a diagram for explaining effects to be brought about by the object detection method according to the first embodiment of the present invention.

As described above in detail, the object detection method and the object detection apparatus according to the first embodiment estimate the crossing object existence areas where the objects which are likely to cross the host vehicle in the future in the planned travel area currently exist, and detect the objects by use of the three-dimensional date on the inside of the crossing object existence areas. Thereby, the object detection method and the object detection apparatus according to the first embodiment can beforehand detect the objects which are likely to cross the host vehicle in the future. Furthermore, the object detection method and the object detection apparatus according to the first embodiment can decrease the process load since they select the objects to be process based on the crossing object existence areas. For example, in a conventional practice, as illustrated in FIG. 5, a moving object 51 existing on a planned travel route 50 of the host vehicle 30 can be detected as an obstacle, but other moving objects 52 which are likely to cross the host vehicle 30 in the future cannot be detected because the moving objects 52 do not currently exist on the planned travel route 50. In contrast, the object detection method and the object detection apparatus according to the first embodiment estimate the areas where the objects which are likely to cross the host vehicle in the future exist as the crossing object existence areas, and can also beforehand detect the moving objects 52 which do not currently exist on the planned travel route 50 of the host vehicle.

Moreover, the object detection method and the object detection apparatus according to the first embodiment set the planned travel area based on the travel plan information on the host vehicle. Thereby, the object detection method and the object detection apparatus according to the first embodiment can set the planned travel area in accordance with the travel plan information on the host vehicle, and can set the planned travel area accurately.

Besides, the object detection method and the object detection apparatus according to the first embodiment estimate the traveling directions of the objects existing around the host vehicle from the road structure information, and estimate the crossing object existence areas based on the estimated traveling directions of the objects. Thereby, the object detection method and the object detection apparatus according to the first embodiment can determine whether the objects which do not exist on the planned travel route of the host vehicle are likely to cross the planned travel area, and can estimate the crossing object existence areas accurately.

Second Embodiment

Referring to the drawings, descriptions will be hereinbelow provided for a second embodiment of the present invention. A process in step S30 in an object detection process according to the second embodiment is different from the process in step S30 in the object detection process according to the first embodiment. In the first embodiment, the crossing object existence areas are extracted by detecting the categories of the roads which are likely to cross the planned travel area. In contrast, in the second embodiment, crossing objects existence areas are estimated depending on things such as whether the host vehicle is going to travel straight, whether the host vehicle is going to change lanes, whether the hose vehicle is going to merge into a lane. Incidentally, the configuration of the object detection apparatus 1 and the processes, except for the process in step S30, are the same between the second embodiment and the first embodiment, and detailed descriptions for them will be omitted.

Figure 6:
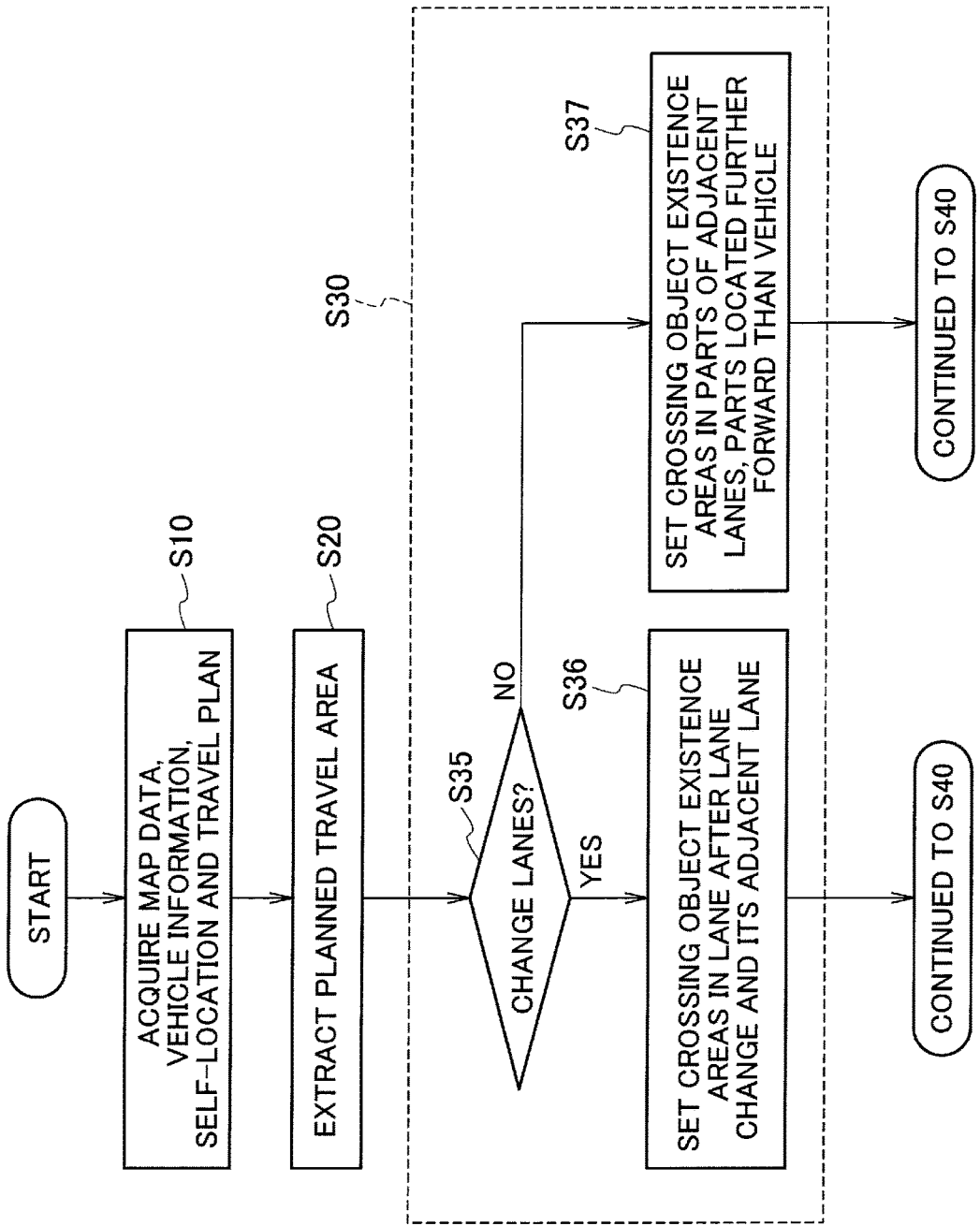
FIG. 6 is a flowchart illustrating a procedure for an object detection process to be performed by an object detection apparatus according to a second embodiment of the present invention.

As illustrated in FIG. 6, once the planned travel area is extracted in step S20, the crossing object existence area extractor 22 determines in step S35 whether the host vehicle is going to change lanes in a multi-lane road. The determination may be made depending on whether the planned travel area extracted in step S20 includes a lane change, or depending on whether the travel plan information includes the lane change. If the crossing object existence area extractor 22 determines that the host vehicle is going to change lanes, the procedure proceeds to step S36. If the crossing object existence area extractor 22 determines that the host vehicle is not going to change lanes, the procedure proceeds to step S37.

Figure 7:
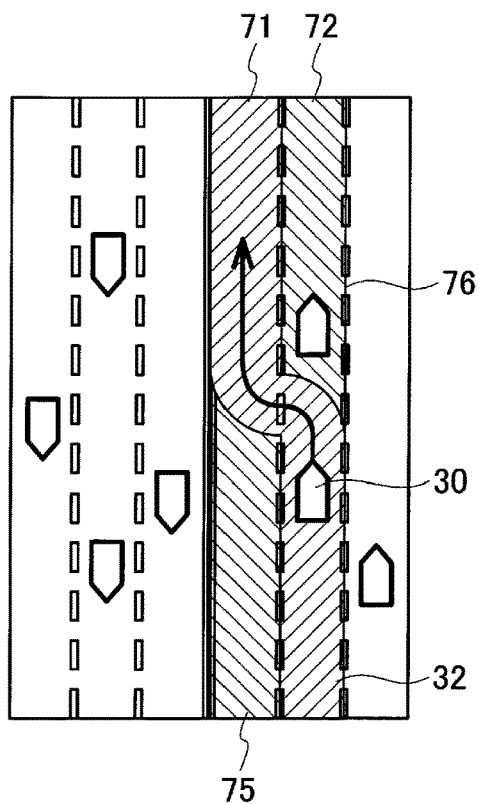
FIG. 7 is a diagram for explaining how to estimate crossing object existence areas when a host vehicle changes lanes in a multi-lane road in the second embodiment of the present invention.

In step S36, the crossing object existence area extractor 22 sets crossing object existence areas, respectively, in a part of a lane into which the host vehicle is going to move, and in a part of a lane adjacent to the lane into which the host vehicle is going to move, the part extending frontward and rearward from the host vehicle. In a case illustrated in FIG. 7, because the host vehicle 30 is going to make a lane change leftward, crossing object existence areas 75, 76 are set in a part of a lane 71 into which the host vehicle 30 is going to move, the part extending frontward and rearward from the host vehicle 30, while a crossing object existence area 76 is set in a part of a lane 72 adjacent to the lane 71 into which the host vehicle 30 is going to move, the part extending frontward and rearward from the host vehicle 30. For example, in the area 75 illustrated in FIG. 7, the traveling direction of the vehicle traffic lane which is likely to cross the host vehicle in the future is detected as a straight traveling direction or a rightward lane change direction. If an object currently in the area 75 starts to accelerate, the object will cross the planned travel area 71. For this reason, the object is estimated as an object which is likely to cross the host vehicle in the future, and the area 75 where the object currently exists is estimated as a crossing object existence area. Similarly, in the area 76, the traveling direction of the vehicle traffic lane which is likely to cross the host vehicle in the future is detected as a straight traveling direction or a leftward lane change direction. If an object currently in the area 76 starts the leftward lane change, the object will cross the planned travel area 71. For this reason, the object is estimated as an object which is likely to cross the host vehicle in the future, and the area 76 where the object currently exists is estimated as a crossing object existence area.

Figure 8:
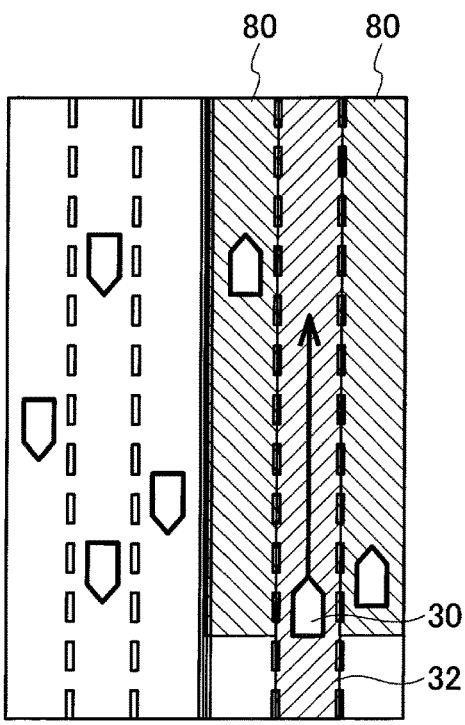
FIG. 8 is a diagram for explaining how to estimate crossing object existence areas when a host vehicle is going to travel straight in a multi-lane road in the second embodiment of the present invention.

In step S37, the crossing object existence area extractor 22 sets crossing object existence areas in parts of lanes adjacent to a planned travel area, the parts located frontward of the host vehicle. As illustrated in FIG. 8, in a case where the host vehicle 30 is going to travel straight, crossing object existence areas 80 are set in parts of lanes adjacent to the planned travel area 32, the parts located frontward of the host vehicle. For example, in each area 80 illustrated in FIG. 8, the traveling direction of the vehicle traffic lane which are likely to cross the host vehicle in the future are detected as a direction of a lane change to the lane in which the host vehicle is traveling. If an object currently in the area 80 starts a lane change to the lane in which the host vehicle is traveling, the object will cross the planned travel area 32. For this reason, the object is estimated as an object which is likely to cross the host vehicle in the future, and the area 80 where the object currently exists is estimated as a crossing object existence area.

[Effects of Second Embodiment]

As discussed above, in the case where the host vehicle is going to change lanes on the multi-lane road, the object detection method and the object detection apparatus according to the second embodiment estimate crossing object existence areas, respectively, in a part of the lane into which the host vehicle is going to move, and in a part of a lane adjacent to the lane into which the host vehicle is going to move, the parts extending frontward and rearward from the host vehicle. Thereby, even in the case where the host vehicle is going to change lanes on the multi-lane road, the object detection method and the object detection apparatus according to the second embodiment can beforehand detect the objects which are likely to cross the host vehicle in the future before and after the lane change.

Furthermore, in the case where the host vehicle is going to travel straight on the multi-lane road, the object detection method and the object detection apparatus according to the second embodiment estimate the crossing object existence areas in parts of the lanes adjacent to the planned travel area, the parts located frontward of the host vehicle. Thereby, the object detection method and the object detection apparatus according to the second embodiment can beforehand detect the objects which are likely to cross the host vehicle in the future with taken into consideration things such as a possibility that any one of the objects moves suddenly in front of the host vehicle while the host vehicle is traveling straight on the multi-lane road.

Third Embodiment

Referring to the drawings, descriptions will be hereinbelow provided for a third embodiment which is an application of the present invention. A process in step S30 in the object detection process according to the third embodiment is different from the processes in step S30 in the object detection processes according to the first and second embodiments. In the first and second embodiments, the size of the crossing object existence areas is set constant. In contrast, in the third embodiment, the size of the crossing object existence areas is set depending on the speed of the host vehicle, or a relative speed between the host vehicle and the objects existing around the host vehicle. Incidentally, the processes other than the process in step S30 are the same between the third embodiment and the first embodiment, and detailed descriptions will be omitted.

Figure 9:
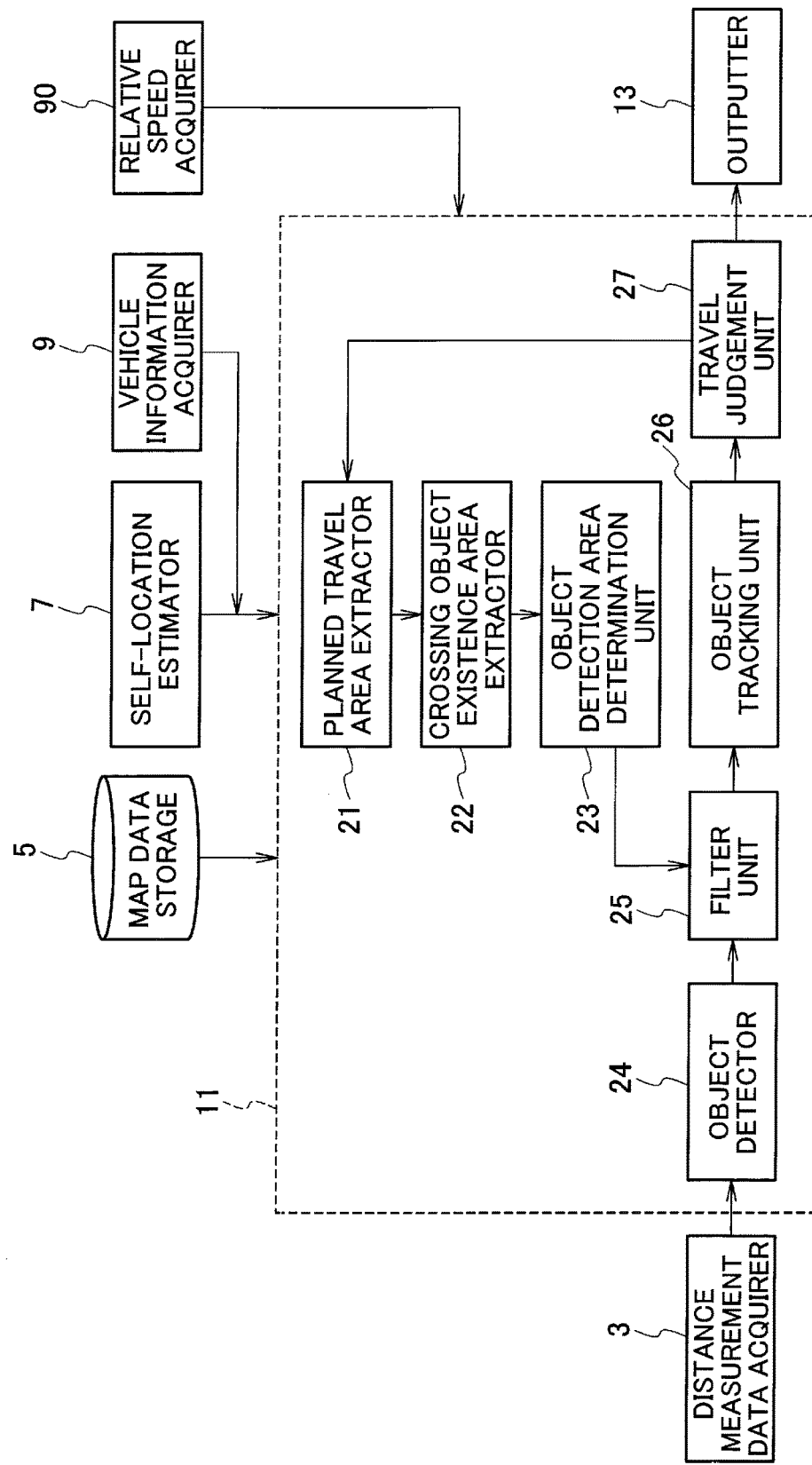
FIG. 9 is a block diagram illustrating a configuration of an object detection apparatus according to a third embodiment of the present invention.

As illustrated in FIG. 9, an object detection apparatus 100 according to the third embodiment is different from the object detection apparatuses according to the first and second embodiments in that the object detection apparatus 100 further includes a relative speed acquirer 90. The relative speed acquirer 90 acquires the relative speed between the host vehicle and the objects existing around the host vehicle by use of a laser radar or the like. Incidentally, the configuration of the object detection apparatus, except for the relative speed acquirer 90, is the same between the third embodiment and the first embodiment, and detailed descriptions for the configuration will be omitted.

Figure 10:
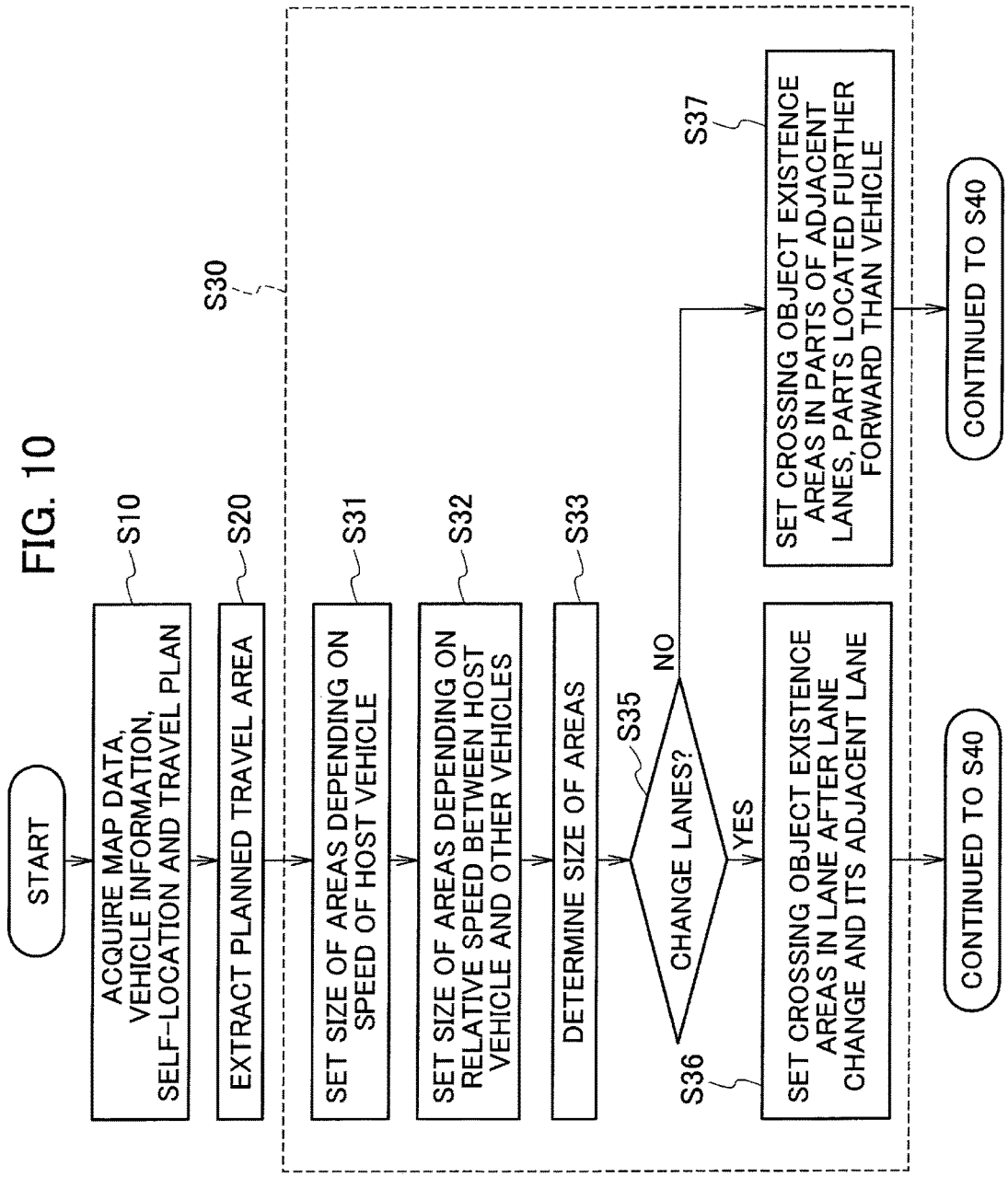
FIG. 10 is a flowchart illustrating a procedure for an object detection process to be performed by the object detection apparatus according to the third embodiment of the present invention.

As illustrated in FIG. 10, the object detection process according to the third embodiment is different from the object detection process according to the second embodiment in that the object detection process according to the third embodiment includes steps S31 to 33 in addition to the steps in the object detection process according to the second embodiment illustrated in FIG. 6. Incidentally, the object detection process according to the third embodiment may include steps S31 to S33 in addition to the steps in the object detection process according to the first embodiment. Once the planned travel area is extracted in step S20, the crossing object existence area extractor 22 sets a size L1 of the crossing object existence areas in step S31, depending on an absolute speed Vs of the host vehicle acquired from the vehicle information acquirer 9. The size L1 of the crossing object existence areas may be set, for example, by calculating $L1=\alpha Vs$, where $\alpha$ is a constant of proportion.

In step S32, the crossing object existence area extractor 22 sets a size L2 of the crossing object existence areas depending on a relative speed Vo between the host vehicle and the objects existing around the host vehicle which is acquired from the relative speed acquirer 90. The size L2 of the crossing object existence areas may be set, for example, by calculating $L2=\beta Vo$ where $\beta$ is a constant of proportion. Incidentally, the relative speed Vo may be, for example, an average of relative speeds between the host vehicle and the observed vehicles, or the largest value which is the largest among the relative speeds between the host vehicle and the observed vehicles. Otherwise, the relative speed Vo may be a relative speed between the host vehicle and the objects detected by the object detector 24.

Figure 11:
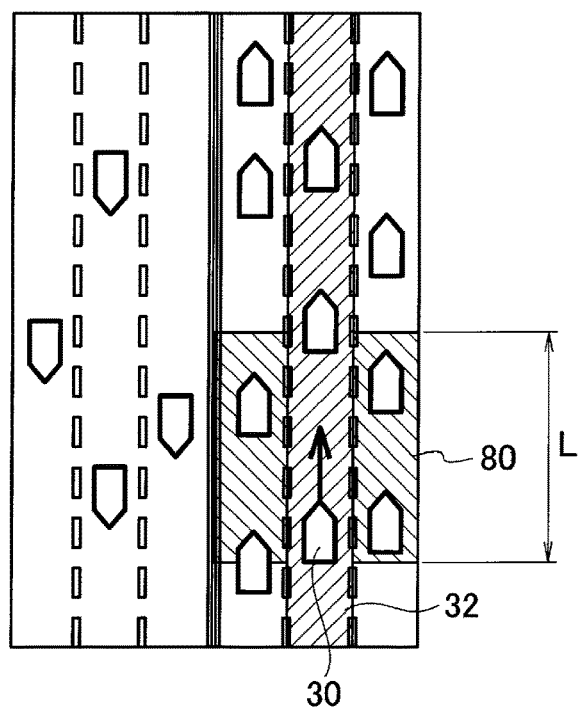
FIG. 11 is a diagram for explaining how to set a size of crossing object existence areas in an object detection method according to the third embodiment of the present invention.
Figure 12:
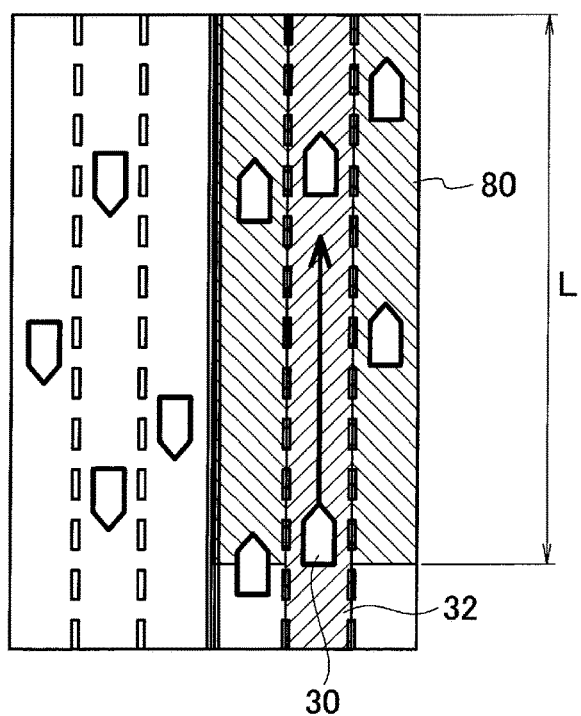
FIG. 12 is a diagram for explaining how to set the size of the crossing object existence areas in the object detection method according to the third embodiment of the present invention.
Figure 13:
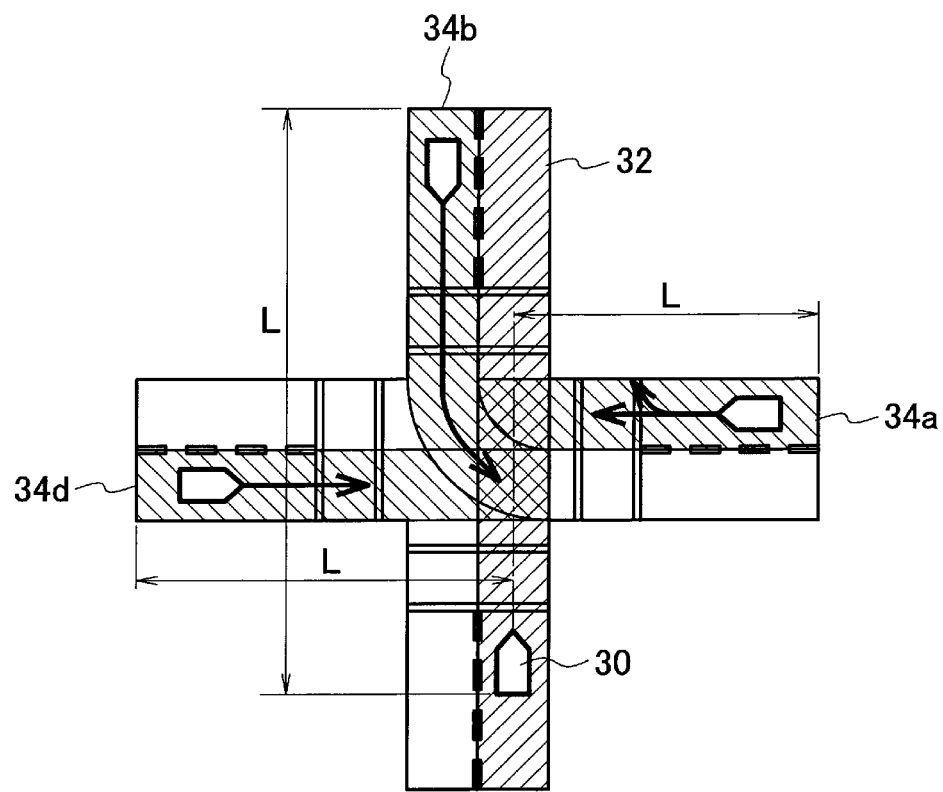
FIG. 13 is a diagram for explaining how to set the size of the crossing object existence areas in the object detection method according to the third embodiment of the present invention.

In step S33, the crossing object existence area extractor 22 determines the size L of the crossing object existence areas by selecting either the size L1 set in step S31 or the size L2 set in step S32. For example, in a case where the host vehicle is traveling on a multi-lane road, the crossing object existence area extractor 22 may determine and employ the larger of the size L1 and the size L2. In a case where the host vehicle and the vehicles around the host vehicle are traveling at slow speed because of traffic congestion, the size L of the crossing object existence areas 80, that is to say, the length of the crossing object existence areas 80 in the traveling direction of the host vehicle, may be made smaller as illustrated in FIG. 11. In other words, it suffices to make sure that obstacles in a range which affects the travel plan of the host vehicle are detected. Therefore, as the relative speed becomes lower, only objects in an area nearer to the host vehicle may be detected in the areas where there exist objects which are likely to cross the host vehicle in the future. On the other hand, in a case where the host vehicle and the vehicles around the host vehicle are traveling at high speed on a highway, the size L of the crossing object existence areas may be made larger, as illustrated in FIG. 12. In other words, what is needed is to detect obstacles in the area which affects the travel plan of the host vehicle. Therefore, as the relative speed becomes higher, objects in an area farther from the host vehicle need to be detected in the areas where there exist objects which are likely to cross the host vehicle in the future. Furthermore, in a case where, as illustrated in FIG. 13, the host vehicle stops at an intersection while waiting for the traffic signal to turn blue so that the relative speed between the host vehicle and the vehicles around the host vehicle is large, either the size L1 or the size L2 whose value is the larger of the two sizes may be employed. Otherwise, the size L2 set depending on the relative speed may be employed. This makes it possible to increase the size L of the crossing object existence areas, that is to say, the length of the crossing object existence areas in the traveling direction of the other vehicles. Once the size of the crossing object existence areas are set as discussed above, the procedure proceeds to step S35.

[Effects of Third Embodiment]

As discussed above in detail, the object detection method and the object detection apparatus according to the third embodiment set the size of the crossing object existence areas depending on the speed of the host vehicle, or the relative speed between the host vehicle and the vehicles around the host vehicle. Thereby, depending on the driving conditions around the host vehicles, the object detection method and the object detection apparatus according to the third embodiment can set the needed crossing object existence areas in the range which affects the travel plan of the host vehicle.

Fourth Embodiment

Referring to the drawings, descriptions will be hereinbelow provided for a fourth embodiment which is an application of the present invention. A process in step S10 in the object detection process according to the fourth embodiment is different from the process in step S10 in the object detection process according to the first embodiment. In the first embodiment, the travel plan information is acquired, and the planned travel area is set based on the travel plan information. In contrast, in the fourth embodiment, the lane category of a vehicle traffic lane where the host vehicle is traveling is acquired from the road structure information included in the map data, and a planned travel area is extracted based on the lane category. Incidentally, the configuration of the object detection apparatus 1 and the processes, except for the process in step S10, are the same between the fourth embodiment and the first embodiment, and detailed descriptions for them will be omitted.

Figure 14:
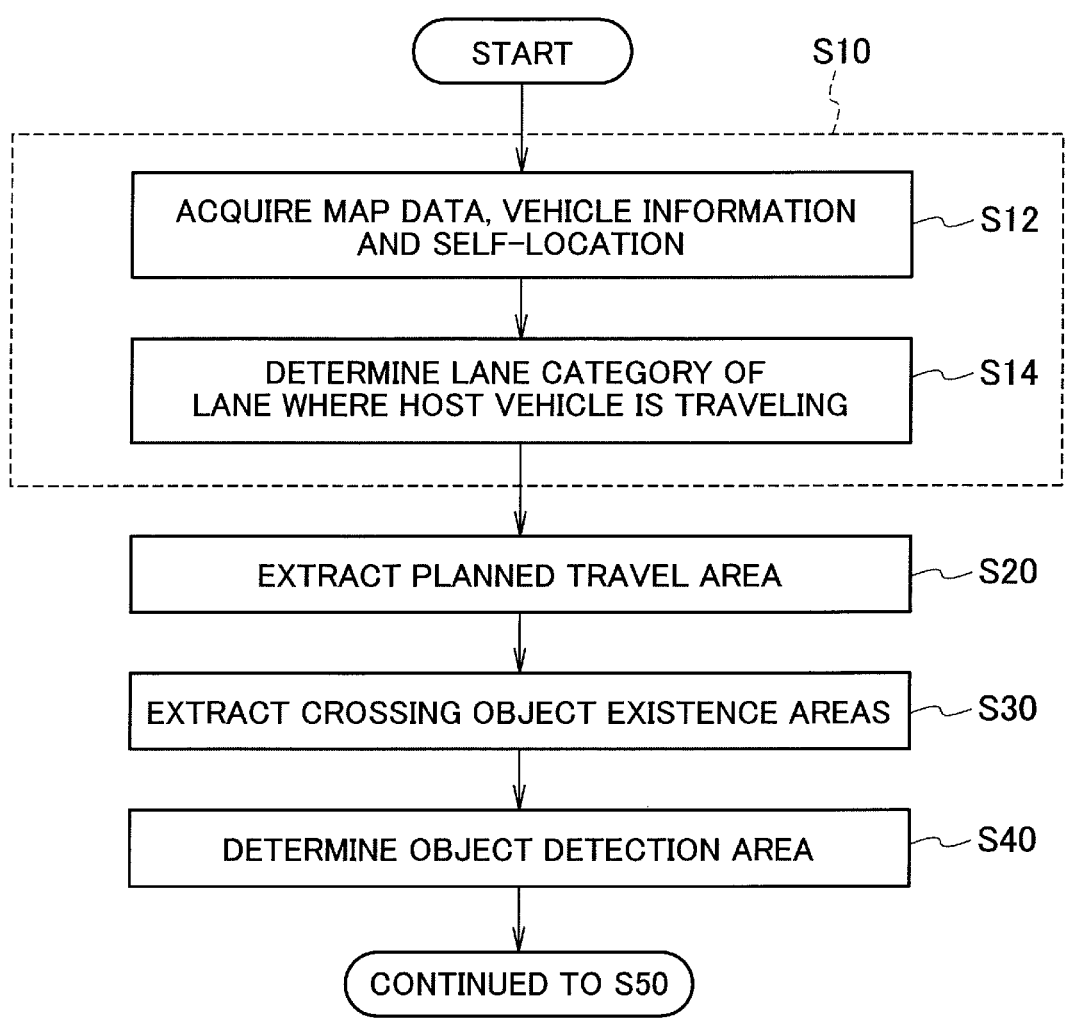
FIG. 14 is a flowchart illustrating a procedure for an object detection process to be performed by an object detection apparatus according to a fourth embodiment of the present invention.

As illustrated in FIG. 14, the object detection process according to the fourth embodiment is different from the object detection process according to the first embodiment illustrated in FIG. 2 in that the object detection process according to the fourth embodiment includes steps S12 and S14 instead of step S10 in the object detection process according to the first embodiment. Incidentally, the object detection process according to the fourth embodiment may include steps S12 and S14 in addition to the object detection process according to either the second or third embodiment. In step S12, the planned travel area extractor 21 acquires the map data from the map data storage 5, the self-location information from the self-location estimator 7, and the vehicle information from the vehicle information acquirer 9, but not the travel plan information from the travel judgement unit 27.

In step S14, from the self-location information of the host vehicle, and the road structure information included in the map data, the planned travel area extractor 21 acquires the lane category of a vehicle traffic lane where the host vehicle is traveling. In the road structure information, the traveling directions of vehicle traffic lanes, such as a right-turn lane, a left-turn lane, a straight-traveling lane, and a left-turn and straight-traveling lane are recorded as lane categories. Thus, the planned travel area extractor 21 detects the vehicle traffic lane where the host vehicle is traveling from the self-location information, and acquires the lane category of the vehicle traffic lane where the host vehicle is traveling from the road structure information.

Figure 15:
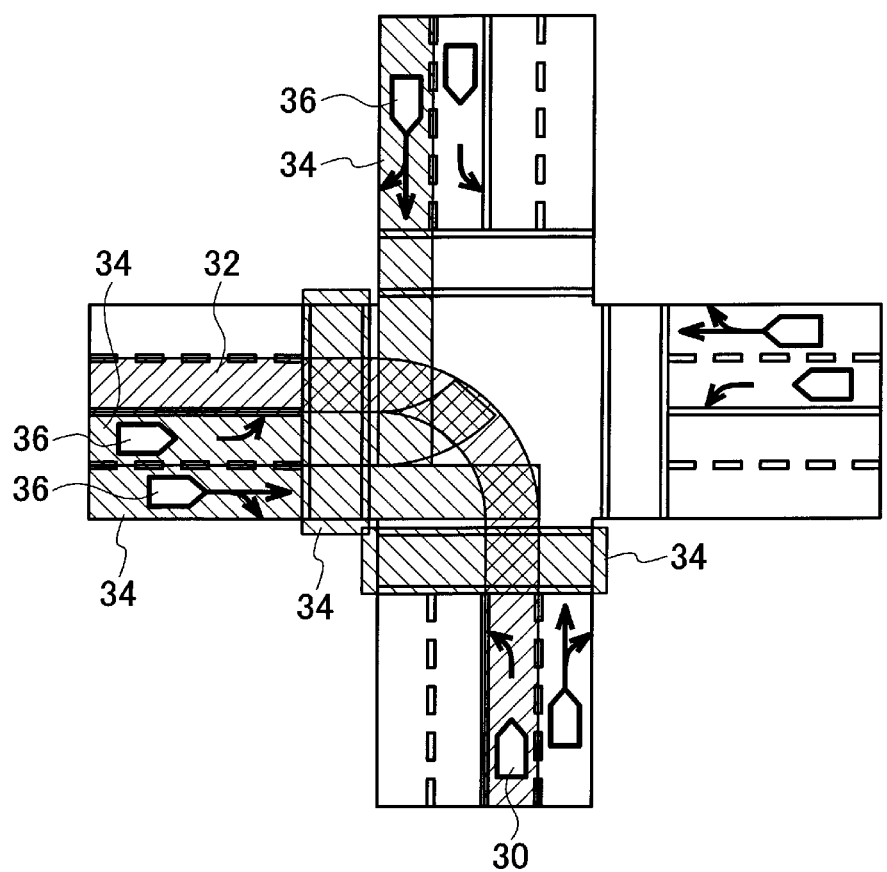
FIG. 15 is a diagram for explaining how to set a planned travel area in an object detection method according to the fourth embodiment of the present invention.

In step S20, based on the information acquired in steps S12 and S14, the planned travel area extractor 21 extracts a planned travel area where the host vehicle is going to travel in the future on the map. Particularly, based on the lane category determined in step S14, the planned travel area extractor 21 extracts the planned travel area. For example, in a case where, as illustrated in FIG. 15, the host vehicle 30 is traveling along a vehicle traffic lane exclusively for the left turn in an intersection, the planned travel area extractor 21 can set the planned travel area 32 as a left-turn route based on the lane category without acquiring the travel plan information from the travel judgement unit 27. Incidentally, the planned travel area extractor 21 can set the planned travel area more accurately by taking the lane category discussed in this embodiment and the travel plan information discussed in the first embodiment into consideration.

[Effects of Fourth Embodiment]

As discussed above, the object detection method and the object detection apparatus according to the fourth embodiment acquire the lane category of the vehicle traffic lane where the host vehicle is traveling from the road structure information included in the map data, and set the planned travel area based on the lane category, Thereby, the object detection method and the object detection apparatus according to the fourth embodiment can set the traveling direction of the host vehicle from the lane category, and can set the planned travel area accurately depending on the vehicle traffic lane where the host vehicle is currently traveling.

Fifth Embodiment

Referring to the drawings, descriptions will be hereinbelow provided for a fifth embodiment which is an application of the present invention. An object detection process according to the fifth embodiment is different from the object detection process according to the first embodiment in that the object detection process according to the fifth embodiment estimates each extracted crossing object existence area based on the state of a traffic signal and the road regulation. Incidentally, the processes except for processes in added steps are the same between the fifth embodiment and the first embodiment, and detailed descriptions for them will be omitted.

Figure 16:
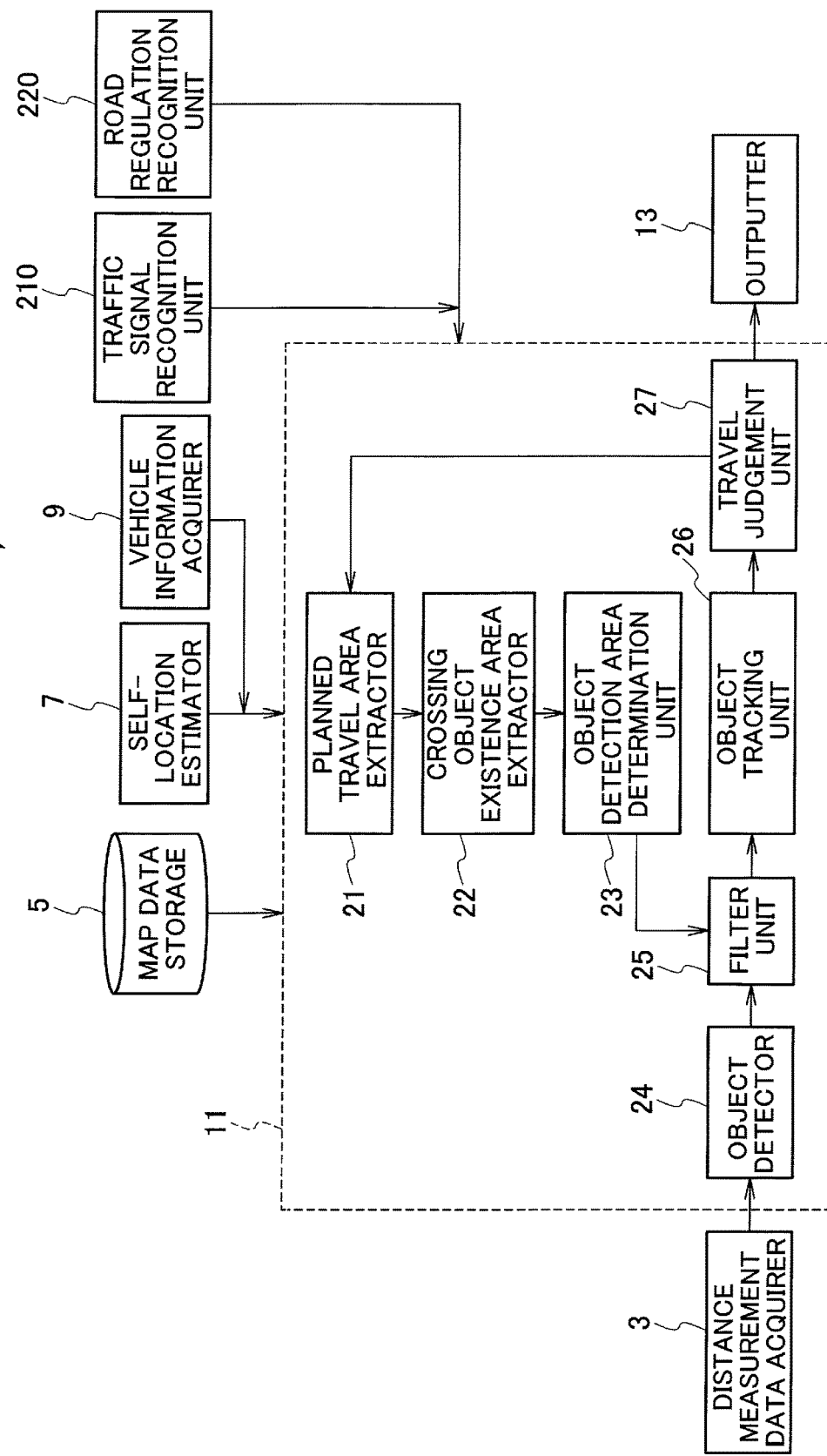
FIG. 16 is a block diagram illustrating a configuration of an object detection apparatus according to a fifth embodiment of the present invention.

As illustrated in FIG. 16, an object detection apparatus 200 according to the fifth embodiment is different from the object detection apparatuses according to the first to fourth embodiments in that the object detection apparatus 200 further includes a traffic signal recognition unit 210 and a road regulation recognition unit 220. The traffic signal recognition unit 210 recognizes the states of traffic signals along the planned travel route of the host vehicle by use of images captured by the camera installed in the host vehicle, information acquired through road-to-vehicle communication, and the like. The states of the traffic signals to be recognized by the traffic signal recognition unit 210 include usual red, blue and yellow signal lights, as well as directions of arrow signals. The traffic signal recognition unit 210 further recognizes the states of pedestrian crossing traffic signals. The road regulation recognition unit 220 recognizes the road regulation governing the roads around the host vehicle by use of road regulation information included in the map data, and images of road sings captured by the camera installed in the host vehicle. One-way signs, no right turn signs, no left turn signs, no entry signs and the like displayed on road sign posts are recognized as the road regulation. Incidentally, the rest of the configuration is the same between the fifth embodiment and the first embodiment, and detailed descriptions for it will be omitted.

Figure 17:
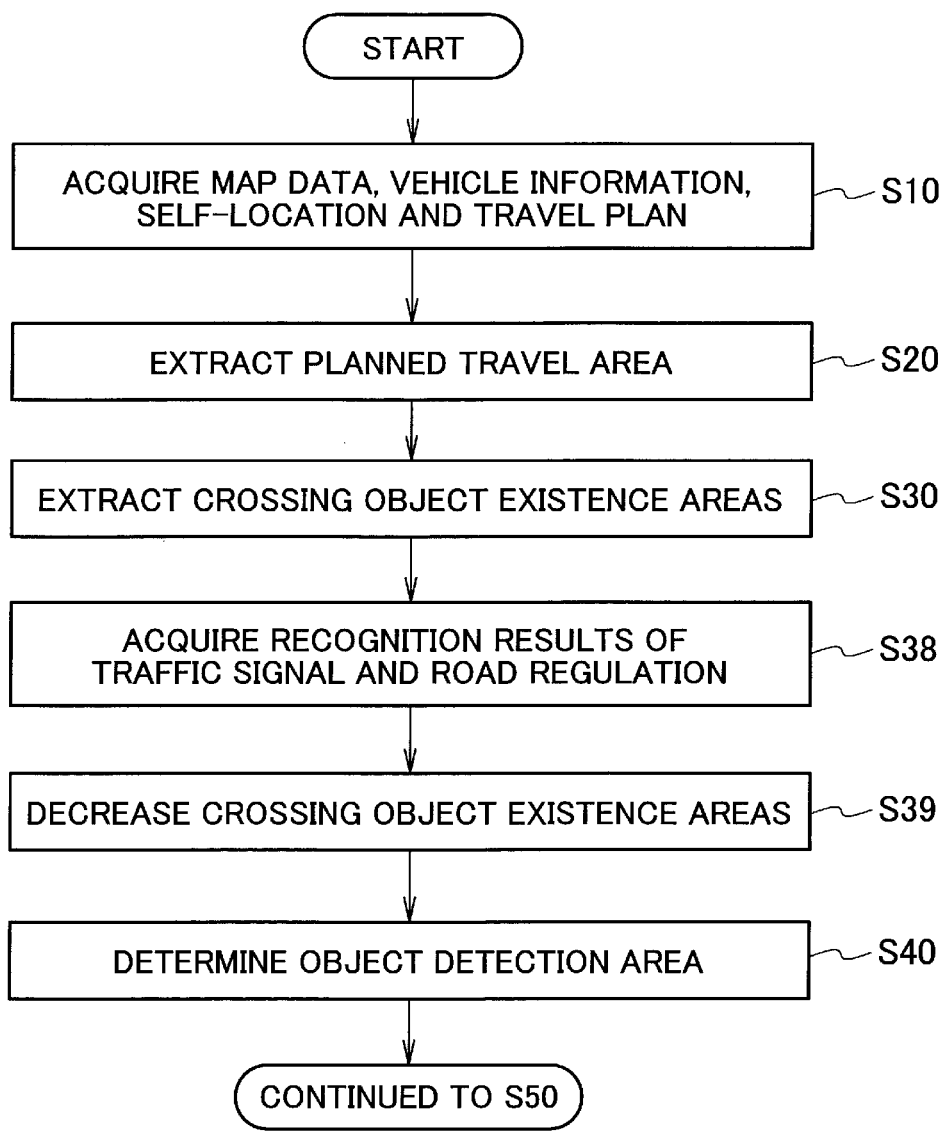
FIG. 17 is a flowchart illustrating a procedure for an object detection process to be performed by the object detection apparatus according to the fifth embodiment of the present invention.

The object detection process according to the fifth embodiment is different from the object detection process according to the first embodiment in that, as illustrated in FIG. 17, the object detection process according to the fifth embodiment includes steps S38 and S39 in addition to the steps included in the object detection process according to the first embodiment. Instead, the object detection process according to the fifth embodiment may include steps S38 and S39 in addition to the steps included in the object detection process according to any one of the second to fourth embodiments. Once the crossing object existence areas are extracted in step S30, the crossing object existence area extractor 22 in step S38 acquires a recognition result of traffic signal state from the traffic signal recognition unit 210, and acquires a recognition result of road regulation from the road regulation recognition result 220.

Figure 18:
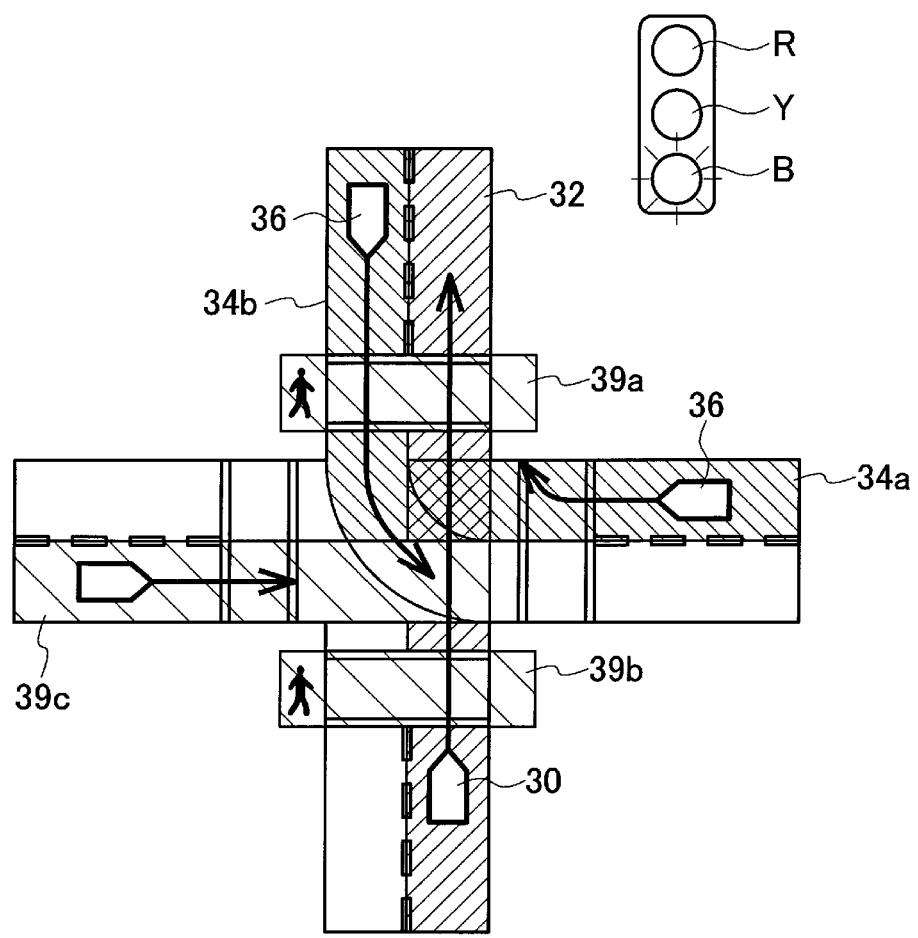
FIG. 18 is a diagram for explaining how to decrease the number of crossing object existence areas using the state of a traffic signal in an object detecting method according to the fifth embodiment of the present invention.

In step S39, based on the acquired recognition results, the crossing object existence area extractor 22 excludes areas where there exist no objects which are likely to cross the host vehicle in the future from the crossing object existence areas extracted in step S30, and thereby estimates final crossing object existence areas. In a case where, as illustrated in FIG. 18, the host vehicle 30 is going straight through the intersection while the traffic signal is blue, the traffic signals for the pedestrian crossings are red, and the host vehicle 30 is no longer likely to cross the pedestrians. For this reason, areas 39a, 39b in the pedestrian crossings are excluded from the crossing object existence areas. Similarly, because the traffic signal which controls a road extending leftward from the intersection is red, an area 39c is also excluded from the crossing object existence areas. On the other hand, although the traffic signal which controls a road extending rightward from the intersection is red, a vehicle on the road may turn right, and an area 34a is not excluded from the crossing object existence areas.

Figure 19:
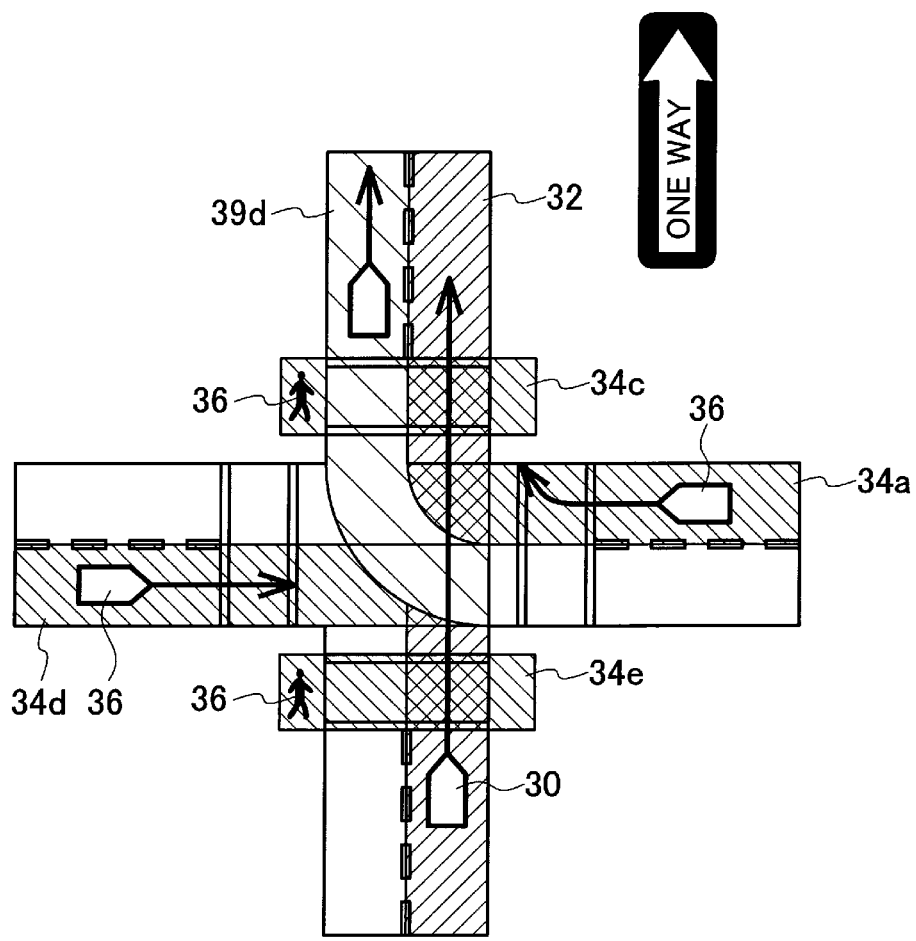
FIG. 19 is a diagram for explaining how to decrease the number of crossing object existence areas using a road regulation in the object detecting method according to the fifth embodiment of the present invention.

Furthermore, in a case where, as illustrated in FIG. 19, the road regulation designates one-way traffic beyond the intersection, the direction of an area 39d is the same as the direction of the lane where the host vehicle 30 is going to travel straight through the intersection, and the area 39d is not an oncoming lane. Thus, vehicles on the area 39d are no longer likely to turn left toward the host vehicle, and the area 39d is excluded from the crossing object existence areas based on the recognition result of the road regulation. Accordingly, the number of crossing object existence areas can be appropriately reduced even in an environment where the lane category of a road changes at time intervals.

[Effects of Fifth Embodiment]

As discussed above, the object detection method and the object detection apparatus according to the fifth embodiment estimate the crossing object existence areas based on the states of the traffic signals around the host vehicle. Thereby, the object detection method and the object detection apparatus according to the fifth embodiment no longer have to detect objects whose movements are prohibited by red traffic lights, and can decrease the process load.

Furthermore, the object detection method and the object detection apparatus according to the fifth embodiment decrease the number of crossing object existence areas based on the road regulation governing the area around the host vehicles. Thereby, the object detection method and the object detection apparatus according to the fifth embodiment no longer have to detect objects whose movements are prohibited by the road regulation, and can decrease the process load.

It should be noted that the foregoing embodiments are examples of the present invention. The present invention is not limited by the embodiments. It is a matter of course that the present invention may be variously modified into modes different from the embodiments in accordance with designs or the like within a scope not departing from technical ideas of the present invention.

REFERENCE SIGNS LIST 1, 100, 200 object detection apparatus
3 distance measurement data acquirer
5 map data storage
7 self-location estimator
9 vehicle information acquirer
11 central controller
13 outputter
21 planned travel area extractor
22 crossing object existence area extractor
23 object detection area determination unit
24 object detector
25 filter unit
26 object tracking unit
27 travel judgement unit
90 relative speed acquirer
210 traffic signal recognition unit
220 road regulation recognition unit

The invention claimed is:

1. An object detection method for an object detection apparatus including a distance measurement sensor for acquiring three-dimensional data on an area around a host vehicle, and configured to detect an object by use of the three-dimensional data acquired by the distance measurement sensor, comprising:

based on map data on an area around a current position of the host vehicle, extracting a vehicle traffic lane which the host vehicle is estimated to travel on a planned travel route from the current position of the host vehicle to a destination as a planned travel area, based on road structure information included in the map data, estimating road categories whose traveling directions point to the planned travel area as crossing object existence areas where there currently exist objects which are likely to cross the host vehicle in the future in the planned travel area, detecting the road categories around the current position of the host vehicle from the road structure information, extracting the crossing object existence areas by extracting the road categories which cross the planned travel area from the detected road categories, and detecting the object by use of the three-dimensional data on insides of the crossing object existence areas.

2. The object detection method according to claim 1, wherein the planned travel area is set based on travel plan information of the host vehicle.

3. The object detection method according to claim 1, wherein traveling directions of the objects which are likely to cross the host vehicle in the future are estimated from the planned travel area and the road structure information included in the map data, the crossing object existence areas are estimated based on the traveling directions.

4. The object detection method according to claim 1, wherein in a case where the host vehicle is going to change lanes, the crossing object existence areas are estimated in a part of a lane into which the host vehicle is going to move and in a part of a lane adjacent to the lane into which the host vehicle is going to move, the parts extending frontward and rearward from the host vehicle.

5. The object detection method according to claim 1, wherein in a case where the host vehicle is going to travel straight on a multi-lane road, the crossing object existence areas are estimated in parts of lanes adjacent to the planned travel area, the parts each located frontward of the host vehicle.

6. The object detection method according to claim 1, wherein a size of the crossing object existence areas is set depending on a speed of the host vehicle, or a relative speed between the host vehicle and objects existing around the host vehicle.

7. The object detection method according to claim 1, wherein the planned travel area is set based on a lane category of a vehicle traffic lane where the host vehicle is traveling, the lane category recorded in the road structure information included in the map data.

8. The object detection method according to claim 1, wherein the crossing object existence areas are estimated based on a state of a traffic signal around the host vehicle.

9. The object detection method according to claim 1, wherein the crossing object existence areas are estimated based on a road regulation governing the area around the host vehicle.

10. An object detection apparatus including a distance measurement sensor for acquiring three-dimensional data on an area around a host vehicle, and configured to detect an object by use of the three-dimensional data acquired by the distance measurement sensor, comprising a controller for based on map data on an area around a current position of the host vehicle, extracting a vehicle traffic lane which the host vehicle is estimated to travel on a planned travel route from the current position of the host vehicle to a destination as a planned travel area, based on road structure information included in the map data, estimating road categories whose traveling directions point to the planned travel area as crossing object existence areas where there currently exist objects which are likely to cross the host vehicle in the future in the planned travel area, detecting the road categories around the current position of the host vehicle from the road structure information, extracting the crossing object existence areas by extracting the road categories which cross the planned travel area from the detected road categories, and detecting the object by use of the three-dimensional data on insides of the crossing object existence areas.

* * * * *